United States Patent [19]

Lamoth

[11] 4,388,586

[45] Jun. 14, 1983

[54] FIXED FREQUENCY VOLTAGE REGULATOR

[75] Inventor: Mihaly Lamoth, Coppet, Switzerland

[73] Assignee: Motorola, Inc., Schaumburg, Ill.

[21] Appl. No.: 331,870

[22] Filed: Dec. 17, 1981

[51] Int. Cl.³ .............................................. G05F 1/56
[52] U.S. Cl. ..................... 323/283; 320/64; 322/28; 323/322
[58] Field of Search ...................... 320/64; 322/28, 36, 322/37, 69, 70; 323/282, 283, 322, 351, 353

[56] References Cited

U.S. PATENT DOCUMENTS

| | | | |
|---|---|---|---|
| 3,631,258 | 12/1971 | Eisenstadt | 322/28 X |
| 4,054,820 | 10/1977 | Foster | 323/283 X |
| 4,346,338 | 8/1982 | Nakamoto et al. | 322/28 |
| 4,360,773 | 11/1982 | Voss | 322/28 |

Primary Examiner—William M. Shoop
Attorney, Agent, or Firm—Joe E. Barbee

[57] ABSTRACT

A fixed frequency, variable duty cycle voltage regulator having a precision reference voltage source is provided. The reference voltage source is a bandgap reference circuit including a plurality of series-connected diodes and having a variable temperature coefficient. The output of the precision reference voltage source is combined by a digitally switched attenuator to provide a staircase waveform to a comparator. This variable staircase waveform is compared against the output of an alternator. The comparator sets the output of a flip-flop to an off state when the staircase waveform goes below the output from the alternator. This removes the drive from a current switch which switches off the current flow through the field coil of the alternator. Current limiting protection is provided to the regulator output.

3 Claims, 5 Drawing Figures

FIXED FREQUENCY VOLTAGE REGULATOR

CROSS REFERENCE TO RELATED APPLICATION

Application No. SC-81239 entitled "Fixed Frequency Voltage Regulator", filed on even date herewith and assigned to the assignee of the present invention.

This invention relates, in general, to voltage regulators for use in an automotive battery charging system, and more particularly, to an improved fixed frequency voltage regulator having a variable duty cycle.

Modern day automotive battery charging systems use an alternator and an electronic voltage regulator. A charging system has to supply a relatively constant voltage independent of the load current. This is typically accomplished by switching on and off the alternator's field current. If the switching of the alternator's field current occurs at too low a frequency flickering of the vehicle's lights could occur. To avoid any low frequency problems, vehicle manufacturers typically specify a minimum switching frequency of 25 Hz. In addition, vehicle manufacturers prefer a voltage regulator which will charge the vehicle's battery to a voltage which depends on ambient temperature. Many times the temperature coefficient requested varies between vehicle manufacturers. Therefore, preferably, the voltage regulator should be provided with means for adjusting this temperature coefficient.

Accordingly, it is an object of the present invention to provide an improved fixed frequency voltage regulator having a variable duty cycle.

Another object of the present invention is to provide a voltage regulator whose output temperature coefficient can be adjusted and which utilizes an improved bandgap reference circuit.

Yet another object of the present invention is to provide a voltage regulator whose output is protected against excess currents.

A further object of the present invention is to provide a fixed voltage regulator which is useable in automotive battery charging systems which use an amp meter or a light indicator to indicate operation of the battery charging system and wherein the output voltage of the regulator is independent of the power supply for the alternator.

SUMMARY OF THE INVENTION

The above and other objects and advantages of the present invention are provided by a fixed frequency voltage regulator having a variable duty cycle. A bandgap voltage reference capable of variable temperature coefficients provides an output which is combined with the output from an oscillator by a digitally switched attenuator. The output of the digitally switched attenuator is compared against the alternator output voltage by a comparator. The output of the comparator is used to switch a flip-flop which drives a current switching means. The current switching means switches current through a field coil of the alternator. Current sensing means coupled in series with the current switching means is utilized to protect the regulator output against excess currents.

DETAILED DESCRIPTION OF THE DRAWINGS

Figure 1:
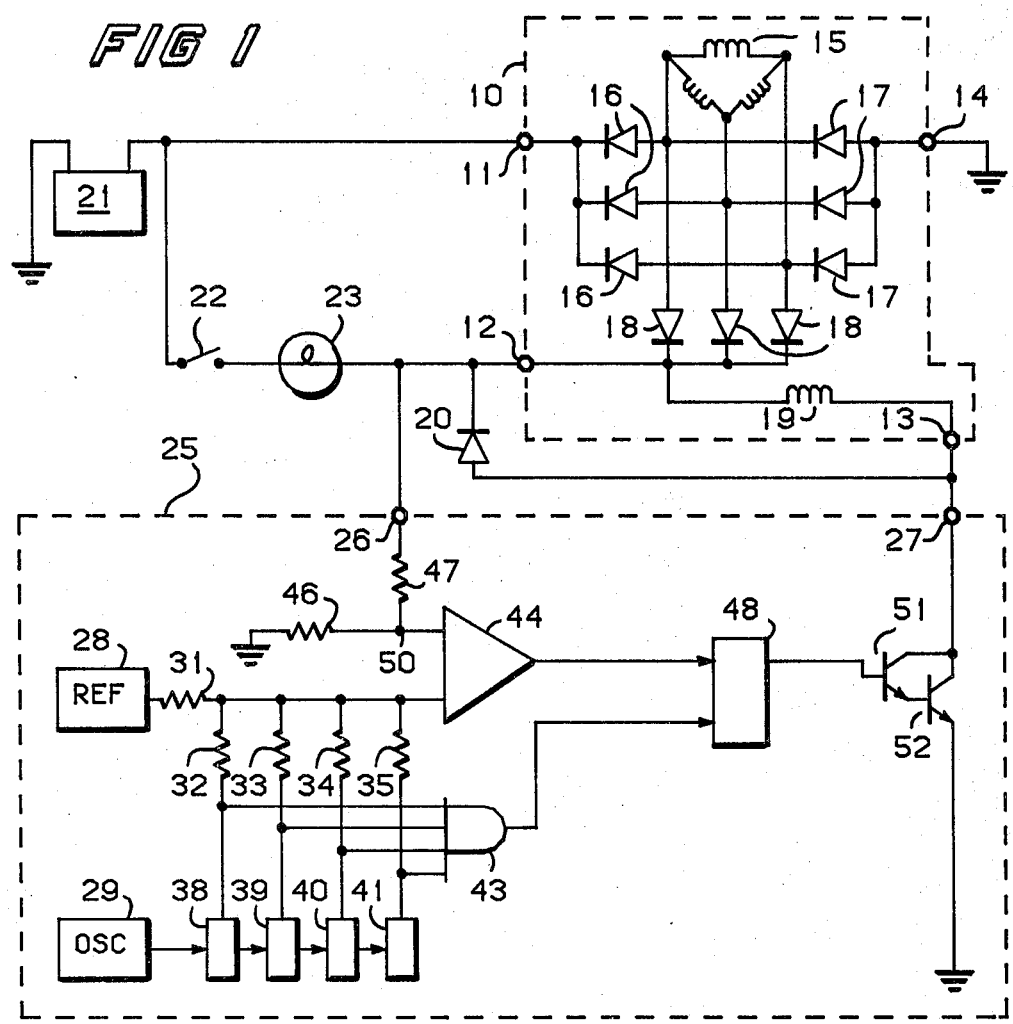
FIG. 1 illustrates one embodiment of the invention.

An automotive battery charging system is illustrated in FIG. 1. An alternator 10 has terminals 11, 12, 13 and 14. Terminal 11 provides an output which is connected to battery 21 to provide the charging potential for battery 21. Terminal 12 provides an output which is used to power voltage regulator 25 and is also connected to light indicator 23 to counter the output from terminal 11 when switch 22 is closed. Switch 22 represents the ignition switch of the vehicle containing the battery charging system. When ignition switch 22 is first closed, light 23 will illuminate indicating that alternator 10 is not rotating. The power for light 23 is obtained from battery 21. As the vehicle is started up, alternator 10 will rotate thereby producing an output voltage at terminal 12 which is substantially equal to the output voltage at terminal 11. Since the voltage on both sides of indicator light 23 are substantially equal, light 23 will not illuminate.

Terminal 14 of alternator 10 is connected to ground. Terminal 13 is connected to terminal 27 of voltage regulator 25. Terminal 13 is connected to one end of field coil 19. The other end of field coil 19 is connected to the cathodes of three diodes 18. The cathodes of diodes 18 are also connected to terminal 12. A diode 20 is connected in parallel with field coil 19 to handle the back currents through coil 19. The cathode of diode 20 is connected to terminal 12 and the anode of diode 20 is connected to terminal 13. Alternator 10 has a stator 15 which is connected in a delta configuration. Stator 15 provides three outputs. Three diodes 16 connected to terminal 11 are each connected to one of the outputs of stator 15 and each of three diodes 17 which are connected to terminal 14 are also connected to each of the outputs of stator 15. Diodes 17 have their anodes connected to terminal 14 and their cathodes are connected to each of the outputs of stator 15. Diodes 16 have their cathodes connected to terminal 11 and each of their anodes connected to one of the outputs of stator 15. Each of the anodes of diodes 18 is connected to one of the outputs of stator 15 while the cathodes of diodes 18 are all connected to terminal 12 and to one end of field coil 19. Terminal 11 is connected to one terminal of battery 21 while the other terminal of battery 21 is connected to ground.

Voltage regulator 25 has a precision reference voltage 28 which provides an output coupled to resistor 31. Oscillator 29 provides an output to a first flip-flop or frequency divider 38. The output of divider 38 is connected to frequency divider 39 which provides an output to divider 40. Divider 40 provides an output to divider 41. Dividers 38, 39, 40 and 41 also provide outputs to resistors 32, 33, 34 and 35 respectively. Resistors 32 through 35 have their second end connected to the second end of resistor 31. As illustrated, resistors 31 through 35 and dividers 38 through 41 form a digitally switched four-bit resistive attenuator and provide a staircase modulation which is superimposed on the reference voltage provided by reference 28. This staircase modulation superimposed on the reference voltage is coupled to an input of comparator 44. A second input of comparator 44 is coupled to a junction or node 50 formed by resistors 46 and 47. Resistor 46 is coupled between ground and the second input of comparator 44 and resistor 42 is coupled between terminal 26 and the second input of comparator 44. Resistors 46 and 47 form a voltage divider to divide down the voltage provided at the output of terminal 12 to allow comparator 44 to sense a voltage proportional to the voltage provided at terminal 12. Regulator 25 is powered by the voltage appearing at terminal 26 which is connected to terminal 12. In other words, all the circuitry contained by voltage regulator 25 receives its operating power source from terminal 26.

Comparator 44 provides an output which is connected to flip-flop 48. The output of flip-flop 48 is connected to the base electrode of transistor 51. Transistors 51 and 52 are connected in a Darlington configuration between ground and terminal 27. Terminal 27 is connected to terminal 13 which in turn is connected to field coil 19. Transistors 51 and 52 form a switching means to control the current flow through field coil 19. Comparator 44 is set up so that as the reference voltage goes below the voltage provided at node 50 the comparator will cause the output of flip-flop 48 to go to zero thereby shutting off switching means 51, 52. Outputs of dividers 38, 39, 40 and 41 are also coupled into inputs of AND gate 43. The output of AND gate 43 is coupled to flip-flop 48 and is used to cause the output of flip-flop 48 to go to a high level thereby enabling transistor 51 which in turn also causes transistor 52 to be enabled.

Figure 2:
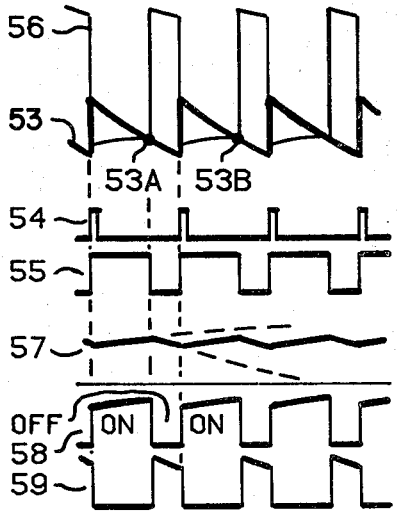
FIG. 2 illustrates waveforms useful in understanding the operation of the circuit of FIG. 1.

The operation of voltage regulator 25 will now be explained with reference to the waveforms shown in FIG. 2. The top waveform 53 is the input to comparator 44 provided by the digitally switched resistive attenuator. The second waveform 54 is the output of logic or AND gate 43 and is used to set the output of flip-flop 48 to a high level. Waveform 55 represents the output signal of flip-flop 48. Waveform 56 represents the voltage variation at node 50 which in turn results from a voltage step caused by diodes 18. Waveform 57 represents the current through coil 19. Waveform 58 represents the current through transistor 52 and diodes 18. Waveform 59 represents the current through diode 20. Immediately after the rising edge of the staircase waveform 53, flip-flop 48 is switched on by a pulse 54 from logic gate 43. Flip-flop 48 causes transistor 52 to be enabled thereby allowing the current through field coil 19 to increase as shown by waveform 57. At the same time the current is deviated from diode 20 and diverted into diodes 18, which causes a negative voltage step of waveform 56, since the voltage drop across diodes 18 increases. The pulse from waveform 54 causes the Darlington transistor pair to be turned on and they will remain on until the voltage reference goes below the voltage provided by voltage divider 46 and 47. Point 53A on waveform 53 indicates the level of the voltage provided by the voltage divider. As waveform 53 continues decreasing below point 53A flip-flop 48 will be turned off thereby disabling transistors 51 and 52 as indicated by waveform 55. Now the current of coil 19 is taken away from diodes 18 and flows through diode 20, causing a positive voltage step at output terminal 12 and of waveform 56. Flip-flop 48 will remain in the off state until the next successive cycle. A pulse shown by waveform 54 is generated on the leading edge of staircase waveform 53 thereby turning on flip-flop 48 which causes the current of coil 19 to flow through transistor 52 and diodes 18 as represented by waveform 58. Once again as waveform 53 goes below the voltage level provided by voltage divider 46 and 47, which is represented by point 53B, flip-flop 48 will be turned off again thereby disabling transistors 51 and 52. Waveform 56 represents the voltage variation at node 50 as provided by voltage divider 46 and 47. The voltage steps are caused by the change of the voltage drop across diodes 18 when switching coil 19 current from diodes 18 into diode 20 and vice versa. Note that the regulator works independently of the magnitude of the voltage steps of waveform 56.

Figure 3:
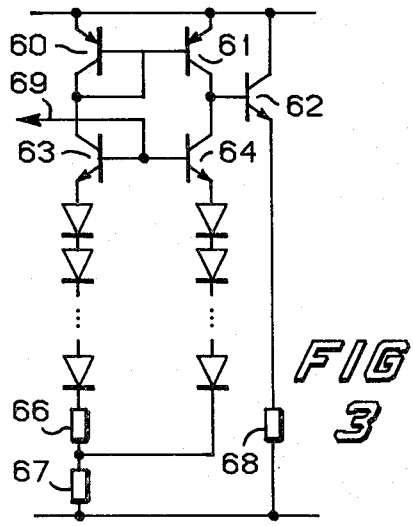
FIG. 3 illustrates a voltage reference circuit useable in the present invention.

FIG. 3 shows a modified bandgap circuit which provides an output reference voltage on line 69 which would be coupled to resistor 31. Bandgap circuits are well-known in the art and those persons skilled in the art will recognize that the temperature coefficient of the circuit can be programmed by the choice of resistors 66 and 67. A bandgap circuit has the advantage that the temperature coefficient of the output voltage is process independent. However, a problem arises when the circuit is trimmed to produce a negative temperature coefficient, especially since, the output voltage is relatively low and becomes even lower at elevated temperatures. In order to obtain higher output voltages, the bandgap circuit has been modified by the addition of series connected diodes between the emitter of transistor 63 and resistor 66 and the addition of the diodes between the emitter of transistor 64 and the junction between resistor 66 and 67. The diodes are connected so that their anodes are towards the emitters of the transistors while their cathodes are towards the resistors. Transistors 63 and 64 have their collectors connected to a current mirror formed by transistors 60 and 61. The collector of transistor 64 is also connected to the base electrode of a transistor 62. Transistor 62 is coupled in series with a resistor 68 between the positive and negative rails of the circuit. In the present application the negative rail is connected to ground. In a preferred embodiment, the supply voltage of the circuit is provided by an internal voltage regulator. The output of the circuit is taken from line 69 which is connected to the emitter of transistor 62. The emitter of transistor 62 is also connected to the base electrodes of transistor 63 and 64. The addition of the series connected diodes is to increase the output voltage at line 69. The temperature coefficient remains process independent.

Figure 4:
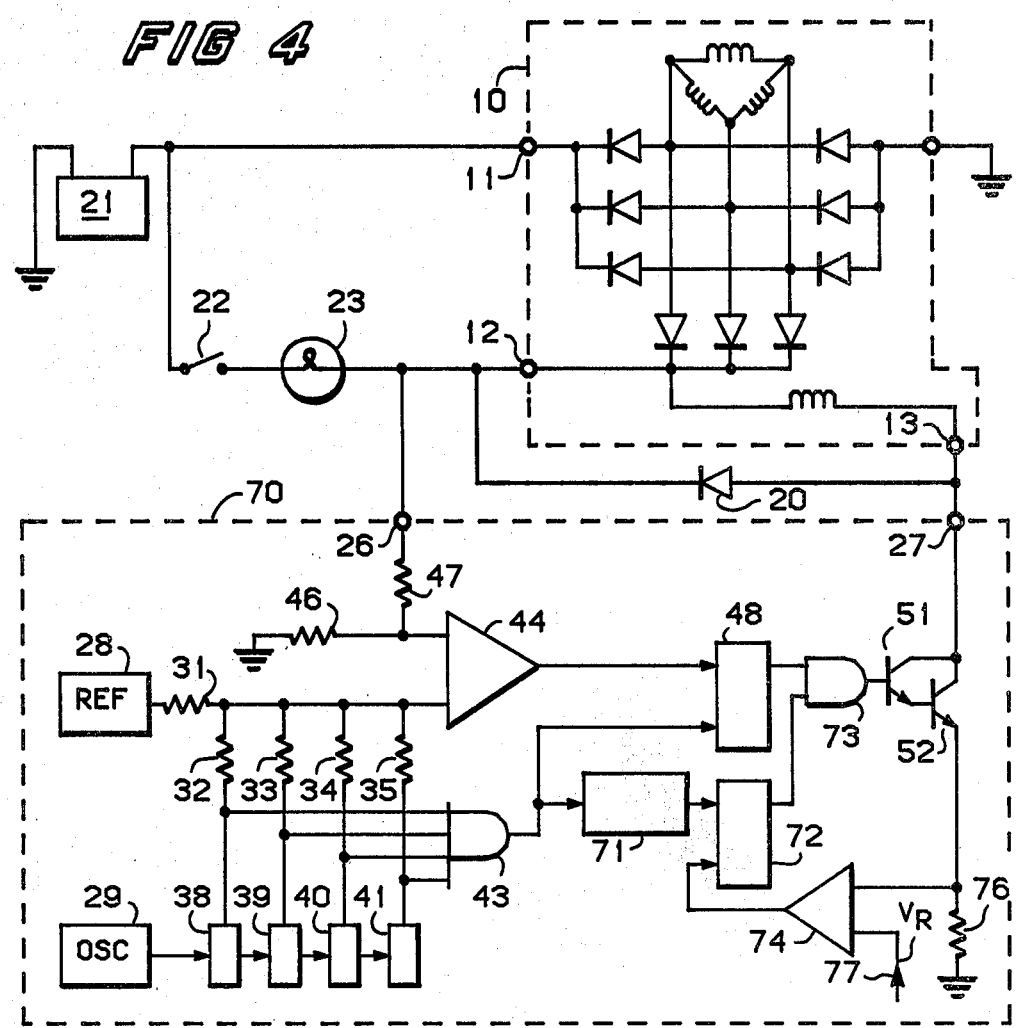
FIG. 4 illustrates another embodiment of the present invention.

FIG. 4 shows another embodiment of the present invention. All the elements of FIG. 4 which are the same as the elements in FIG. 1 have the same reference numerals and their function and interconnection will not be explained with reference to FIG. 4. Alternator 10 operates in the same manner. Voltage regulator 70 operates in a similar manner to voltage regulator 25 of FIG. 1; however, voltage regulator 70 includes an added provision to protect excessive current from flowing through transistors 51 and 52. In certain situations excessive current could be available to flow through transistors 51 and 52 which would damage the transistors. A sensing resistor 76 is placed in series between the emitter of transistor 52 and ground. The current flow through resistor 76 is sensed by comparator 74 and compared against the reference voltage available on input 77. The reference voltage on input 77 could be obtained from a resistive voltage divider provided between terminal 26 and ground; however, in a preferred embodiment the reference voltage is obtained from a resistive voltage divider connected to an internal voltage regulator circuit. The output of comparator 74 is connected to a flip-flop 72. Another input to flip-flop 72 is provided from differentiator 71 which has an input connected to the output of logic gate 43. Differentiator 71 takes the output of logic gate 43 and provides a narrow pulse to flip-flop 72. The output of logic gate 43 also goes to flip-flop 48 as discussed hereinbefore. The outputs of flip-flops 48 and 72 are connected to inputs of a logic gate illustrated as AND gate 73. The output of logic gate 73 is used to drive Darlington configured transistors 51 and 52.

Figure 5:
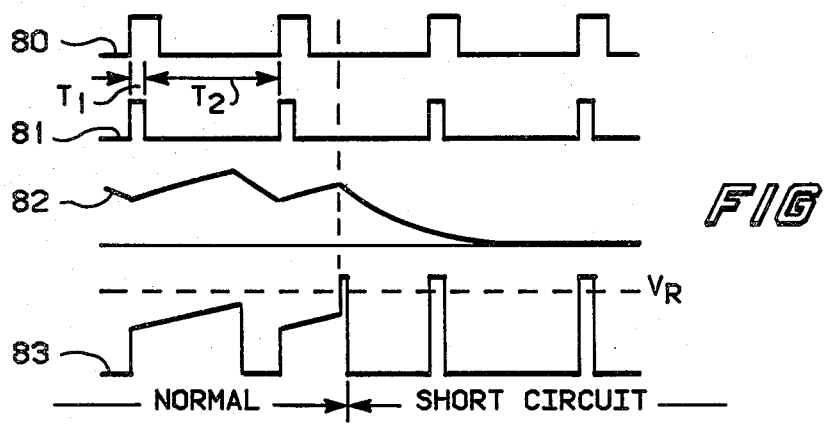
FIG. 5 illustrates waveforms useful in understanding the operation of the circuit of FIG. 4.

The operation of voltage regulator 70 will now be explained with reference to the waveforms shown in FIG. 5. The top waveform 80 represents the turn on pulse provided by logic gate 43. The second waveform 81 illustrates the pulse provided by differentiator 71 and shows the relationship between time period T1 and time period T2 of waveform 81. Waveform 82 represents the field current that flows through field coil 19, and waveform 83 represents the current that flows through transistor 52. The left-hand portions of waveforms 82 and 83 illustrate normal operating conditions whereas the right-hand portion illustrates the operation of voltage regulator 70 during a short circuit condition, such as might exist if terminals 11 and 27 were shorted together to provide an increased amount of current into the Darlington configured transistors 51 and 52. The bottom waveform 83 also illustrates the voltage sensed across resistor 76 whereas the dotted line at the top of waveform 83 illustrates a reference voltage $V_R$ at input 77. The current limitation protection provided by regulator 70 must be larger than the maximum field current of alternator 10. As mentioned hereinbefore, logic gate 43 provides a turn on pulse at the beginning of a staircase waveform. Differentiator 71 provides a very short pulse width T1 to flip-flop 72 to set flip-flop 72 in the on state. With flip-flop 72 in the on state then logic gate 73 will gate the output of flip-flop 48 to the base electrode of transistor 51. When voltage regulator 70 is operating under normal conditions the Darlington configured transistors 51 and 52 will be switched on and off controlling the output of alternator 10 as described hereinbefore with reference to FIGS. 1 and 2. The current flowing through transistor 52 is sensed by resistor 76 and compared by comparator 74 against voltage reference $V_R$. An increase in the collector current in transistors 51 and 52 results in an increase of the voltage across resistor 76 at the input of comparator 74. When this current exceeds the predetermined value as indicated by the narrow pulse in the center of waveform 83 the output from comparator 74 will reset flip-flop 72 to the off state. And with the output of flip-flop 72 in the off state, logic gate 73 will no longer couple the output from flip-flop 48 to transistor 51 and therefore transistors 51 and 52 will no longer conduct. In other words, when logic gate 73 is closed or not enabled by flip-flop 72 the field current to field coil 19 is switched off via Darlington configured transistors 51 and 52. However, the next on pulse in waveform 80 and waveform 81 will once again turn on flip-flops 48 and 72 to provide a momentary pulse of current through the Darlington configured transistors which in turn is sensed by resistor 76 causing comparator 74 to reset flip-flop 72 and disable logic gate 73. This cycle could continue until the short circuit is removed or the excess current through Darlington configured transistors 51 and 52 is removed. Waveform 83 illustrates the level of reference voltage $V_R$ and the current sensed by resistor 76.

In an automotive system not having an alternator indicating light 23, field coil 19 would be connected between terminals 12 and 13 and terminal 12 would be connected directly to ignition switch 22. In addition, alternator 19 would not have the three diodes 18.

Although in the past there have been provided battery charging systems having fixed frequencies with a variable duty cycle the voltage regulator portion was more of an analog implementation as opposed to the present digital implementation. Note that the use of flip-flop 48 and logic gate 43 prevent the system's output frequency from dropping to a low value due to the voltage steps at node 50 caused by diodes 18. Flip-flop 48 and logic gate 43 allow the system to operate at the proper frequency under presence of higher voltage steps (hysteresis) of the regulated voltage. Output pulses 54 of gate 43 are used to switch waveform 56 back from the "parasitic" level to the lower level which can be detected by comparator 44. To guarantee proper operation of the system, the pulses of waveform 54 have to keep flip-flop 48 in the "high" state for a time long enough to allow the system to settle down in this state (transistor 52 conducting). In addition, the present invention provides a precision voltage reference having an adjustable temperature coefficient and a ramping reference staircase waveform which is provided by a digitally switched resistive attenuator. Also, an improved method of current protection for the output drivers is provided.

What is claimed is:

1. A fixed frequency voltage regulator useable in an automotive battery charging system, comprising: a temperature stable voltage reference providing an output; an oscillator providing an output; a digitally switched attenuator coupled to the output of the oscillator and providing an output which is combined with the output of the voltage reference; a first comparator having a first and a second input and providing an output, the first input receiving the combined output from the attenuator and the voltage reference; a first flip-flop coupled to the output of the first comparator and providing an output; current switching means coupled to the output of the first flip-flop for controlling the current switching means; current sensing means coupled in series with the current switching means for sensing current in the current switching means; a second comparator having a first input coupled to the current sensing means and providing an output, a second flip-flop coupled to the output of the second comparator and providing an output; and a second logic gate having a first input coupled to the output of the first flip-flop and having a second input coupled to the output of the second flip-flop, the second logic gate providing an output for controlling the current switching means.

2. The fixed frequency regulator of claim 1 further including a differentiator coupled between the output of the first logic gate and a second input of the second flip-flop.

3. The fixed frequency regulator of claim 1 wherein the temperature stable voltage reference is a bandgap reference circuit including a plurality of diodes connected in series to provide an output reference voltage which is higher than the bandgap voltage.

* * * * *